US008520687B2

(12) United States Patent
Ejzak

(10) Patent No.: US 8,520,687 B2
(45) Date of Patent: Aug. 27, 2013

(54) METHOD AND APPARATUS FOR INTERNET PROTOCOL MULTIMEDIA BEARER PATH OPTIMIZATION THROUGH A SUCCESSION OF BORDER GATEWAYS

(75) Inventor: Richard Paul Ejzak, Wheaton, IL (US)

(73) Assignee: Alcatel Lucent, Paris (FR)

( * ) Notice: Subject to any disclaimer, the term of this patent is extended or adjusted under 35 U.S.C. 154(b) by 456 days.

(21) Appl. No.: 11/774,369

(22) Filed: Jul. 6, 2007

(65) Prior Publication Data

US 2009/0010270 A1    Jan. 8, 2009

(51) Int. Cl.
*H04L 12/28* (2006.01)

(52) U.S. Cl.
USPC ......... 370/401; 370/402; 370/352; 379/93.01

(58) Field of Classification Search
USPC ............... 370/401–404, 352, 493; 379/93.01
See application file for complete search history.

(56) References Cited

U.S. PATENT DOCUMENTS

| | | | |
|---|---|---|---|
| 6,625,652 B1 | 9/2003 | Miller et al. | |
| 7,356,031 B1 | 4/2008 | Toebes et al. | |
| 7,472,411 B2 * | 12/2008 | Wing et al. | 726/5 |
| 7,710,869 B1 * | 5/2010 | Gleichauf et al. | 370/229 |
| 8,144,711 B1 * | 3/2012 | Pegrum et al. | 370/394 |
| 2002/0103919 A1 * | 8/2002 | Hannaway | 709/231 |
| 2003/0028670 A1 | 2/2003 | Lee et al. | |
| 2003/0115360 A1 | 6/2003 | Edwin et al. | |
| 2005/0201304 A1 * | 9/2005 | Olshansky | 370/282 |
| 2005/0254482 A1 * | 11/2005 | Yeom | 370/352 |
| 2006/0072542 A1 * | 4/2006 | Sinnreich et al. | 370/351 |
| 2006/0088063 A1 | 4/2006 | Hartung et al. | |
| 2006/0203001 A1 * | 9/2006 | Van Der Stok et al. | 345/562 |
| 2006/0239261 A1 * | 10/2006 | Bell | 370/389 |
| 2006/0272009 A1 * | 11/2006 | Stott | 726/3 |

(Continued)

FOREIGN PATENT DOCUMENTS

| | | |
|---|---|---|
| CN | 1902889 A | 1/2007 |
| CN | 1317874 C | 5/2007 |
| WO | 2005046182 A1 | 5/2005 |

OTHER PUBLICATIONS

PCT/US2008/008185—International Search Report, May 25, 2009, 3 pages.

(Continued)

*Primary Examiner* — Dang Ton
*Assistant Examiner* — Mandish Randhawa
(74) *Attorney, Agent, or Firm* — Fay Sharpe LLP

(57) ABSTRACT

A method for identifying alternate end-to-end media paths through internet protocol realms using substitute session description protocol parameters is disclosed. The method includes receiving an session description protocol offer, including a list of previously traversed through internet protocol realms. The method continues with determining the next internet protocol realm for a media path based on unspecified signaling criteria. Finally, the method includes that if the next internet protocol realm to be traversed through is on the list of previously traversed through internet protocol realms, bypassing at least one border gateway associated with the current and previously traversed through internet protocol realms. The system implementing a method for identifying optimal end-to-end media paths and internet protocol multimedia subsystems include a list of internet protocol realm instances, an application level gateway configured to receive a session description protocol offer having connection information and port information, and a procedure to determine that if the next internet protocol realm that the media path may traverse through is on the list of instances, the media path connection information and port information is substituted to facilitate border gateway bypassing.

20 Claims, 3 Drawing Sheets

(56) References Cited

U.S. PATENT DOCUMENTS

| | | | |
|---|---|---|---|
| 2007/0019619 A1* | 1/2007 | Foster et al. | 370/352 |
| 2007/0094412 A1 | 4/2007 | Sollee | |
| 2007/0097999 A1 | 5/2007 | Yan | |
| 2007/0101414 A1 | 5/2007 | Wing et al. | |
| 2007/0150773 A1* | 6/2007 | Srivastava | 714/49 |
| 2007/0288639 A1* | 12/2007 | Brown | 709/226 |
| 2008/0075114 A1 | 3/2008 | Mo | |
| 2008/0126541 A1* | 5/2008 | Rosenberg et al. | 709/225 |
| 2008/0178289 A1* | 7/2008 | Gearhart et al. | 726/22 |
| 2008/0225850 A1* | 9/2008 | Oran et al. | 370/392 |
| 2008/0254795 A1* | 10/2008 | Ratcliffe et al. | 455/435.1 |
| 2008/0298237 A1* | 12/2008 | Dos Remedios et al. | 370/233 |
| 2009/0094692 A1 | 4/2009 | Ono et al. | |
| 2009/0172170 A1* | 7/2009 | Rey | 709/227 |
| 2010/0014518 A1 | 1/2010 | Duncan et al. | |
| 2010/0061228 A1 | 3/2010 | Grabelsky et al. | |
| 2010/0098093 A1* | 4/2010 | Ejzak | 370/401 |
| 2010/0142412 A1 | 6/2010 | Synnergren et al. | |
| 2011/0264909 A1* | 10/2011 | Ejzak | 713/153 |

OTHER PUBLICATIONS

PCT/US2008/008185—PCT Written Opinion of the International Searching Authority, May 25, 2009, 5 pages.

Aoun et al., "Identifying intra-realm calls and avoiding media tromboning" IETF Standard-Working-Draft, Internet Engineering Task Force, IETC, CH, Jan. 1, 1900, XP015000106, ISSN: 0000-0004, 9 pages.

Source: Stuart Walker, Leapstone Systems, Inc., Multiservice Switching Forum Contribution; IA for Roaming Between MSF R3 Networks.

Acme Packet Session Border Controller Net-Net SD Technical Overview, Version 3.4.

RFC 2617, Franks et al., HTTP Authentication: Basic and Digest Access Authentication, Network Working Group, Jun. 1999, 34 pp.

RFC 3489, Rosenberg et al., STUN—Simple Traversal of User Datagram Protocol (UDP) Through Network Address Translators (NATs), Network Working Group, Mar. 2003, 24 pp.

RFC 3264, Rosenberg et al., An Offer/Answer Model with the Session Description Protocol (SDP), Network Working Group, Jun. 2002, 25 pp.

RFC 3325, Jennings et al., Private Extensions to the Session Initiation Protocol (SIP) for Asserted Identity Within Trusted Networks, Network Working Group, Nov. 2002, 18 pp.

RFC 4566, Handley et al., SDP: Session Description Protocol, Network Working Group, Jul. 2006, 49 pp.

RFC 4234, Crocker et al., Augmented BNF for Syntax Specifications: ABNF, Network Working Group, Oct. 2005, 16 pp.

RFC 3325, Jennings et al., Private Extensions to the Session Initiation Protocol (SIP) for Asserted Identity within Trusted Networks, Network Working Group, Nov. 2002, 18 pp.

RFC 2119, Bradner, Key Words for Use in RFCs to Indicate Requirement Levels, Network Working Group, Mar. 1997, 3 pp.

RFC 3261, Rosenberg et al., SIP: Session Initiation Protocol, Network Working Group, Jun. 2002, 87 pp.

RFC 3605, Huitema, Real Time Control Protocol (RTCP) Attribute in Session Description Protocol (SDP), Network Working Group, Oct. 2003, 8 pp.

Rosenberg, Obtaining and Using Globally Routable User Agent (UA) URIs (GRUU) in the Session Initiation Protocol (SIP), Oct. 2007, 41 pp.

Mayhofer et al., A Uniform Resource Identifier for Geographic Areas ('geo' URI), Network Working Group, Feb. 2008, 15 pp.

RFC 1321, Rivest, The MD5 Message-Digest Algorithm, Network Working Group, Apr. 1992, 21 pp.

RFC 3102, Borella et al., Realm Specific IP: Framework, Network Working Group, Oct. 2001, 30 pp.

RFC 3103, Borella et al., Realm Specific IP: Protocol Specification, Network Working Group, Oct. 2001, 54 pp.

RFC 3235, Senie, Network Address Translator (NAT)—Friendly Application Design Guidelines, Network Working Group, Jan. 2002, 13 pp.

RFC 3303, Srisuresh et al., Middlebox Communication Architecture and Framework, Network Working Group, Aug. 2002, 34 pp.

RFC 3489, Rosenberg et al., STUN—Simple Traversal of User Datagram Protocol (UDP) Through Network Address Translators (NATs), Network Working Group, Mar. 2003, 47 pp.

RFC 1889, Schulzrinne et al., RTP: A Transport Protocol for Real-Time Applications, Network Working Group, Jan. 1996, 71 pp.

RFC 3725, Rosenberg et al., Best Current Practices for Third Party Call Control (3pcc) in the Session Initiation Protocol (SIP), Network Working Group, Apr. 2004, 30 pp.

RFC 4340, Kohler et al., Datagram Congestion Control Protocol (DCCP), Network Working Group, Mar. 2006, 26 pp.

Rosenberg, Interactive Connectivity Establishment (ICE): A Protocol for Network Address Translator (NAT) Traversal for Offer/Answer Protocols, Oct. 2007, 99 pp.

Rosenberg et al., Session Traversal Utilities for (NAT) (STUN), Jul. 2008, 51 pp.

Rosenberg et al., Traversal Using Relays around NAT (TURN): Relay Extensions to Session Traversal Utilities for NAT (STUN), Jul. 2008, 31 pp.

TS 23.228, 3rd Generation Partnership Project; Technical Specification Group Services and System Aspects; IP Multimedia Subsystem (IMS); Stage 2, (Release 8), (Sep. 2008), 241 pp.

TS 24.229, 3rd Generation Partnership Project; Technical Specification Group Core Network and Terminals; IP multimedia call control protocol based on Session Initiation Protocol (SIP) and Session Description Protocol (SDP); Stage 3, (Release 8), (Sep. 2008), 559 pp.

English Bibliography for Chinese Patent No. 1706124, published Jan. 24, 2007, Printed from Thomson Innovation on Jun. 20, 2012 (3 pages).

English Bibliography for Chinese Patent Application Publication No. 1317874, published May 23, 2007, Printed from Thomson Innovation on Jun. 20, 2012 (2 pages).

* cited by examiner

METHOD AND APPARATUS FOR INTERNET PROTOCOL MULTIMEDIA BEARER PATH OPTIMIZATION THROUGH A SUCCESSION OF BORDER GATEWAYS

BACKGROUND OF THE DISCLOSURE

This disclosure relates to a method and apparatus for bearer path optimization through a succession of border gateways in an Internet Multimedia Subsystem (IMS) network. More particularly, this disclosure relates to a method and apparatus for identifying alternate end-to-end media paths through Internet Protocol (IP) realms using substitute Session Description Protocol (SDP) parameters.

While the disclosure is particularly directed towards IP multimedia bearer path optimization and thus will be described with specific reference thereto, it will be appreciated that the disclosure may have other usefulness in other fields and applications. For example, this disclosure may be used in a variety of data transfer systems and methods including other systems and methods that utilize the SDP and the SDP offer/answer model. This method and system will allow Session Initiation Protocol (SIP) based networks to bypass one or more border gateways that would otherwise be included in the media path.

By way of background, the IMS/SIP based network is an internet protocol based network that supports many types of user equipment. This user equipment uses Voice over Internet Protocol (VoIP) and other methods to transfer data and voice in real time applications across the IP network. A SIP based network call has a call signaling path and a bearer path. The call signaling path handles call control data which is used to set up, connect and process the call. The bearer path is the voice data connection over which a conversation takes place, and is also referred to as a multimedia session path or media path in this disclosure.

In IMS and other SIP based networks, border gateways are deployed between IP realms defined by each network. Within an IP realm every IP endpoint is reachable from every other IP endpoint using a common IP address space. The border gateways provide security to the IP realm by limiting access to the IP endpoints within an IP realm. A multimedia session path may traverse an arbitrary number of IP realms along an end-to-end media path. When a border gateway has access to additional IP realms on the path, there is an opportunity to create a shorter media path. However, currently there is no system in place to identify and access the shorter media paths potentially available to the session.

Therefore, there is a need in the industry to allow for border gateway bypass procedures. There is further need in the industry to allow border gateway bypass procedures that require no additional signaling messages beyond what is needed for a single end-to-end Session Description Protocol (SDP) offer/answer transaction and that require no new procedures in session IP endpoints. There is further a need in the industry to allow border gateways to protectively manage security and aggregate bandwidth usage for all sessions. Finally, there is a need in the industry to supply an optimization procedure which shortens the route that a bearer path must take, thereby freeing resources of border gateways, reducing bearer traffic through IP networks, and minimizing end-to-end delay, thus improving Quality of Service (QoS).

The present disclosure contemplates a new and improved system and method that resolves the above-referenced difficulties and others.

SUMMARY OF THE INVENTION

A system and method for bearer path optimization through a succession of border gateways is provided. The disclosure will allow for Application Layer Gateways (ALG) to attach additional connectivity information to SDP messages that can be recognized by other ALGs on the path. This will allow for identification of extraneous border gateways on the media path and the substitution of connectivity information in the SDP messages to bypass these extraneous border gateways. This disclosure will also identify alternate media paths using precise SDP parameter substitution procedures which will in turn correctly construct a new optimized end-to-end media path.

In one aspect of the disclosure, the method includes receiving a session description protocol offer, including a list of previously traversed through internet protocol realms, determining the next internet protocol realm for a media path based on unspecified signaling criteria, and if the next internet protocol realm is on the list of previously traversed through internet protocol realms, bypassing at least one border gateway associated with the current and previously traversed through internet protocol realms.

In accordance with another aspect of the present disclosure, the method includes treating host behind a network address port translator as if the host was in its own internet protocol realm.

In accordance with another aspect of the present disclosure, the method includes receiving a session description protocol offer, including a list of previously traversed through internet protocol realms, and if one of the previously traversed through internet protocol realms is reachable from the current border gateway, bypassing at least one border gateway associated with previously traversed through internet protocol realms.

In accordance with another aspect of the present disclosure, the method includes implementing security policies that remove one or more instance of internet protocol realms from the list of previously traversed through internet protocol realms.

In accordance with another aspect of the present disclosure, the method further includes that the list of previously traversed through internet protocol realms include realm identifiers in order to distinguish one internet protocol realm from another.

In accordance with another aspect of the present disclosure, the method includes that the session description protocol offer includes a fully qualified domain name as media path connection information.

In accordance with another aspect of the present disclosure, the method includes that the session description protocol offer includes an internet protocol address as media path connection information.

In accordance with another aspect of the present disclosure, the method includes that the session description protocol offer includes transport protocol port number information.

In accordance with another aspect of the present disclosure, the method includes providing an algorithm private to each internet protocol realm to enable verification of the integrity of information about each instance of previously traversed through internet protocol realms.

In accordance with another aspect of the present disclosure, the method includes that the algorithm implements a cryptographic signature.

In accordance with yet another aspect of the present disclosure, the method includes that if the next internet protocol realm is not on the list of previously traversed through internet protocol realms, adding the internet protocol realm that is associated with the forwarded session description protocol offer to the list of previously traversed through internet protocol realms.

In accordance with yet another aspect of the present disclosure, the method includes that if the internet protocol realm for the incoming session description protocol offer is not on the list of previously traversed through internet protocol realms to be forwarded, adding the internet protocol realm that is associated with the incoming session description protocol offer to the list of previously traversed through internet protocol realms.

In accordance with yet another aspect of the present disclosure, a system for identifying end-to-end media paths and internet protocol multimedia subsystems comprises a list of instances including information identifying internet protocol realms that a session description protocol message has traversed through in order to establish a call, an application level gateway configured to receive a session description protocol offer having media path connection information and port information, a means of determining the next internet protocol realm that the media path may traverse through, and if the next internet protocol realm that the media path may traverse through is on the list of instances of traversed through internet protocol realms, the media path connection information and port information is substituted to facilitate a border gateway bypass.

In accordance with another aspect of the present disclosure, the system includes connection information and transport protocol port number for internet protocol realms to be traversed through on the media path.

In accordance with another aspect of the present disclosure, the system includes that the information associated with an internet protocol realm traversal includes an internet protocol address.

In accordance with another aspect of the present disclosure, the system includes a border gateway, controlled by the application level gateway, where the border gateway is configured to limit access from internet protocol endpoints outside of the internet protocol realm.

In accordance with another aspect of the present disclosure, the system includes that access is restricted via a firewall.

In accordance with another aspect of the present disclosure, the system includes that access is restricted via a network address port translator.

In accordance with another aspect of the present disclosure, the system includes that an internet protocol realm traversal is not included on the list of previously traversed through internet protocol realms for security purposes.

In accordance with another aspect of the present disclosure, a method includes establishing a list of instances which represents the internet protocol realms that a media path may traverse through, receiving a session description protocol offer having media path connection information and port information, determining the next internet protocol realm that the media path may traverse through, examining the list of instances for the next internet protocol realm that the media path may traverse through and if the next internet protocol realm that the media path may traverse through is on the list of instances, substituting the connection information and the port information in the SDP offer in order to bypass at least one border gateway.

In accordance with another aspect of the present disclosure, the method includes that if the next internet protocol realm that the media path may traverse through is on the list of instances more than once, choosing the instance earliest in time from which to substitute the connection information and port information in the session description protocol offer.

In accordance with another aspect of the present disclosure, the method includes implementing a work around procedure in order to manipulate the signaling to keep a network element not implementing a bypass procedure in the media path.

In accordance with another aspect of the present disclosure, the method includes receiving an session description protocol answer with a valid internet protocol address as connection information, recalling the session description protocol parameter substitutions previously applied to the corresponding forwarded session description protocol offer, and manipulating the parameters in the session description protocol answer to establish an end-to-end media path that bypasses one or more border gateways.

In accordance with another aspect of the present disclosure, the method includes receiving an session description protocol answer with an unspecified address as connection information, recalling the session description protocol parameter substitutions previously applied to the corresponding forwarded session description protocol offer, determining whether the traversed through internet protocol realm information in the session description protocol answer matches the internet protocol realm associated with either the incoming or outgoing side of the border gateway, and manipulating the parameters in the session description protocol answer to establish an end-to-end media path that bypasses one or more border gateways.

DESCRIPTION OF THE DRAWINGS

The presently described embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
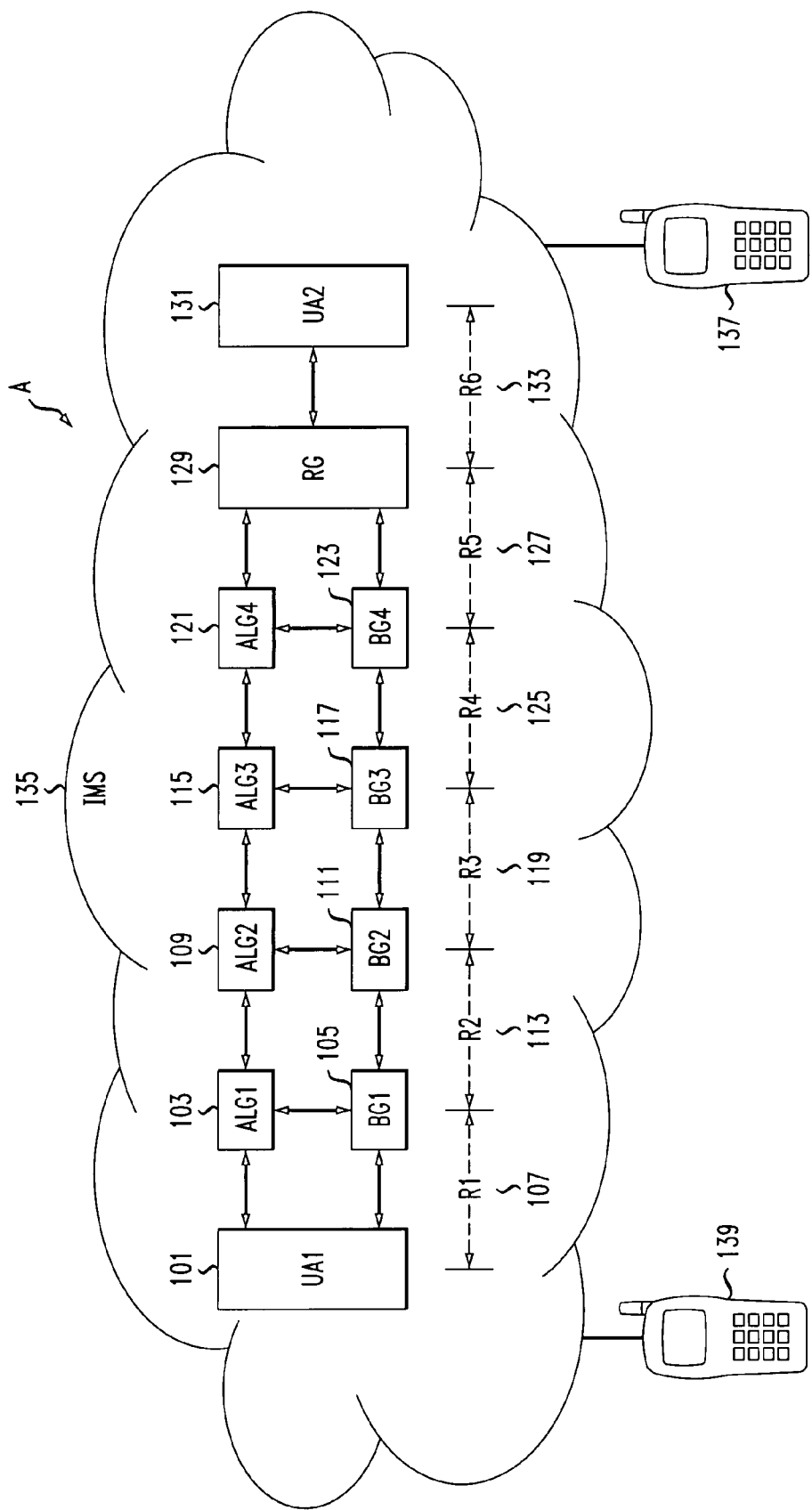
FIG. 1 illustrates a portion of the overall communication network system including a plurality of user agents, a plurality of ALGs, a plurality of border gateways and a plurality of IP realms.

Referring now to the drawings wherein the showings are for purposes of illustrating the disclosed embodiments only and not for purposes of limiting the same. FIG. 1 provides an overall view of the system into which the present disclosure may be incorporated. A communications infrastructure A is shown. The communications infrastructure A includes a first user agent 101, second user agent 131, four ALGs 103, 109, 115 and 121, four border gateways 105, 111, 117 and 123, a residential gateway 129 and six IP realms 107, 113, 119, 125, 127 and 133. It should be understood that this represents but one embodiment of the communications network infrastructure. The present disclosure could be incorporated in a variety of communication network configurations.

In operation as discussed in greater detail below, the presently described embodiments are directed towards IP multimedia bearer path optimization through bypassing of border gateways. The disclosure describes a solution that uses a system of cooperating network elements in order to identify when a border gateway can be bypassed for a more efficient media flow. This disclosure may be incorporated by networks based on protocol using SDP messaging such as IMS of the third generation partnership project (3GPP) which is based on SIP.

Still referring to FIG. 1, the communications infrastructure A includes one or more IMS networks 135 or other networks, which contain a plurality of network elements. The system also includes two associated VoIP telephones 137, 139. The VoIP telephones 137, 139 are in communication with the IMS 135 which contains the above-referenced network elements. All of the above-referenced network elements are in communication in order to connect a voice path between the VoIP telephones 137, 139.

This communications network infrastructure A may include other network elements, for example, other switches and gateways. This communication network may also include other networks such as cellular networks, VoIP networks, the internet, intranets, etc.

Continuing on with FIG. 1, this embodiment includes two VoIP telephones 137, 139. However, other user equipment besides VoIP telephones may be substituted. Other examples of user equipment include, but are not limited to, wireless multimedia telephones, mobile telephones, wireline telephones, laptop computers, WiFi phones, WiMax phones, etc. These devices are typical user equipment used to communicate through compatible lines.

The VoIP telephones 137, 139 may be co-located with the user agent, or may be separate. In most of the cases, the telephone's native IP capability enables the co-location model. When they are separate, the user agent 101, 131 is usually co-located with a signaling gateway to other networks such as the Public Switched Telephone Network (PSTN). In this case, the telephones 137, 139 are connected to the signaling gateway via the PSTN.

Through this disclosure a call may be processed through the user equipment 137 or 139 to the IMS 135. FIG. 1 shows a typical call configuration between IP endpoints UA1 101 and UA2 131. SIP signaling goes between the UAs via at least one ALG and a variety of other SIP servers, which are not shown. The Real time Transport Protocol (RTP) multimedia flow goes between the user agents 101, 131 via the border gateways 105, 111, 117, 123 and optionally via residential gateways (RG) 129 associated with one or both UA1 101 and UA2 131. Each border gateway is controlled by its corresponding ALG. The IP realms 107, 113, 119, 125, 127 and 133 in FIG. 1 are associated with each segment of the multimedia session path. The border gateways 105, 111, 117, 123 and residential gateway 129 act as IP endpoints and access points for the corresponding IP realms. Each border gateway has access to at least the two corresponding IP realms.

The IMS 135 and other SIP networks have the option to deploy border gateways between the IP realms defined by each network. Within an IP realm every IP endpoint is reachable from any other IP endpoint using a common IP address space. Each border gateway typically provides a firewall or Network Address Port Translator (NAPT) to limit access to IP endpoints within a realm. An Application Layer Gateway (ALG) controls each border gateway to allocate new IP addresses and transport protocol ports as necessary for each SDP media line and updates the SDP connection and port information in each forwarded SDP offer and SDP answer to effectively insert the border gateway into the end-to-end multimedia session path.

A multimedia session path may traverse an arbitrary number of IP realms between session IP endpoints. As long as each border gateway in the media path has no connection to IP realms on the media path other than its two directly connected IP realms, there is no option to optimize the media path. But if either IP endpoint of any border gateway on the path has access to an additional IP realm on the path, then a shorter media path exists. A sequence of ALGs implementing the procedures herein, where each ALG can determine the IP address and port information for entities on the media path in its interconnected IP realms, will be able to establish a multimedia session path with the minimum number of border gateways without compromising any of the access controls associated with the border gateways on the path. If one or more ALGs on the signaling path do not implement the procedures then border gateway bypass can still occur but some potentially bypassable border gateways may remain in the media path. This extension also works with hosted NAPT traversal schemes to establish a direct media path between IP endpoints within the same IP realm.

RFC 3264 describes the SDP offer/answer model, which enables SIP networks to establish end-to-end media paths for multimedia sessions. This disclosure describes an SDP extension attribute and some extensions to ALG procedures for forwarding SDP offers and SDP answers. ALGs on the path manipulate the SDP as necessary within a single end-to-end SDP offer/answer transaction to enable establishment of an end-to-end media path with the minimum of border gateways. The SDP extension attribute describes media connection and port information for each IP realm on the path that is a candidate to bypass one or more border gateways on the path.

This disclosure describes an extension and optimization of the ALG approach to NAPT traversal.

The border gateway bypass procedures in this disclosure, avoid the requirement to deploy STUN servers, require no additional signaling beyond what is needed for a single end-to-end SDP offer/answer transaction, require no new procedures to be supported by user agents, allow border gateways to limit access to known IP source addresses, and allow border gateways to predictably manage aggregate bandwidth usage for all sessions.

Since this extension does not incorporate end-to-end connectivity checks of the media path, it takes advantage of accurate provisioning of the IP realms.

Since the procedures in this disclosure include an option to cryptographically certify the candidate connection and port information from each IP realm, they can be used under some circumstances when the signaling traverses non-trusted networks or the Internet at large.

Overview of Operation

FIG. 1 shows a typical call configuration between endpoints User Agent (UA)1 and UA2, where the SIP signaling goes between the UAs via at least one ALG (four are shown) and other SIP servers not shown, and the RTP multimedia flow goes between the UAs via the BGs and possibly an RG associated with each UA (only one RG is shown associated with UA2). Each border gateway (BG) is controlled by its corresponding ALG. R1, R2, etc., in the figure represent the IP realms associated with each segment of the multimedia session path.

The multimedia session path between the UAs is established via an end-to-end SDP offer/answer exchange where each ALG may choose to modify the connection and port information associated with each media line in the SDP to insert its BG in the media path according to normal ALG procedures. Each ALG may also optionally perform the following procedures to identify when one or more BGs and/or RGs can be bypassed and to modify the forwarded SDP messages to implement the corresponding changes in the media path to bypass the BGs.

The border gateway bypass procedures assume Interactive Connectivity Establishment (ICE) is not used by any entity in the architecture, although hybrid procedures are possible.

It is assumed that the UAs participate in standard SDP offer/answer negotiation by presenting standard connection and port information for each media line according to RFC 4566 and RFC 3264. If necessary, the ALGs may use the rtcp attribute defined in RFC 3605 to identify an RTCP port not using the expected default value.

The border gateway bypass algorithm may be implemented within the ALGs. The algorithm has no impact on any aspect of SDP offer/answer negotiation other than the connection and port information associated with each media line.

This disclosure defines an SDP extension attribute 'traversed-realm' that provides connection and port information for a prior IP realm traversed through on the signaling path. Each instance of traversed-realm has an instance number, realm identifier, connection and port data, and optional cryptographic signature computed using an algorithm private to each IP realm so as to ensure the integrity of the traversed-realm data.

Note that the connection and port information in each SDP offer/answer transaction within a session may be handled the same way, as described below, re-allocating and de-allocating BGs as necessary with each SDP offer/answer transaction to accommodate any potential changes in the IP realms associated with the session IP endpoints.

IP Realm Considerations

For the procedures in this specification, the term "IP realm" has a specific meaning beyond the use of the term "realm" for digest authentication. An IP realm has two purposes: 1) to identify a private means by which network entities sharing private information can verify that data communicated via intermediaries remains unchanged; and 2) to identify when one network entity is reachable from another via a fully interconnected common IP address space.

The syntax for the traversed-realm extension attribute defined later in this disclosure clearly describes means of accomplishing purpose 1) using security credentials.

There are many network configurations for which purpose 2) is applicable, as described below.

For example, all hosts in a residence on a private LAN behind an RG/NAPT can be considered to be in their own IP realm, as is the case for IP realm 6, 132. An operator providing hosted NAPT traversal from an ALG in the network can identify a separate IP realm for each such residence and provide the security framework to ensure, for example, that it is possible to provide a media path directly between hosts in the same residence when they are involved in an end-to-end session established via SIP servers in an external network, thus bypassing a potentially significant number of BGs that would otherwise have been allocated using normal ALG procedures.

A very similar example is when there is a private enterprise network using a private IP address space with one or more NAPTs to external networks. The same principles apply as in the residential case. An ALG providing hosted NAPT traversal creates an IP realm for the enterprise, associates the appropriate IP addresses from the enterprise IP realm with a selected identifier and looks for opportunities to bypass BGs in the network.

Session IP endpoints not associated with NAPTs may also be directly connected to an ALG in the network. Those session IP endpoints connected to an ALG that are mutually reachable may be assigned an IP realm.

Once a media path enters a network isolated with ALGs from access and peer networks, all addresses associated with media connections to BGs that are mutually reachable within the network can be considered part of another IP realm. Whenever an ALG forwards an SDP offer back into such an IP realm after traversing through it on a prior hop, there is an opportunity to bypass all BGs traversed through on the "loop" back into the IP realm.

Two interconnected networks may have ALG/BGs directly connected via IPSEC associations over the Internet. There may be one or more IP realms created just to identify these limited connectivity options. Since there will be limited opportunities to bypass BGs via these IP realms, a network may choose to leave these IP realms unidentified and may choose to forward no traversed-realm information associated with these IP realms.

IP addresses reachable from the open internet are associated with the pre-defined IP realm "IN".

These are just a few examples of IP realms. Since no connectivity checks are used to verify reachability, IP realms may be provisioned to correctly identify mutually reachable IP addresses. Networks may provide other means to verify reachability between IP endpoints in their defined IP realms.

ALG Procedures

The ALG procedures in this section apply separately to each media line in each SDP message, and apply separately to each SDP offer/answer transaction.

ALG Handling of SDP Offer

Figure 2:
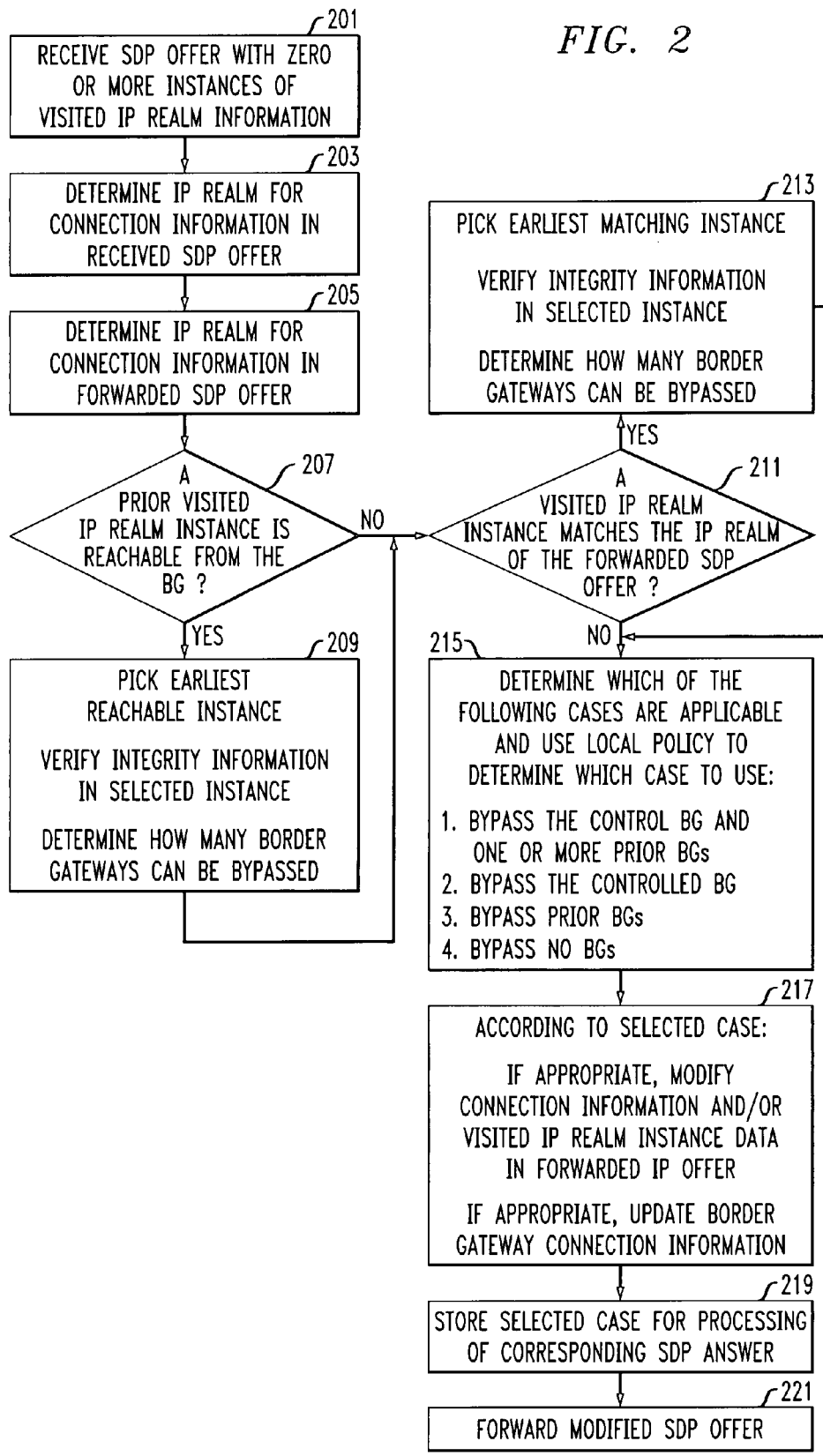
FIG. 2 is a flow diagram illustrating one embodiment of the method according to the present disclosure.

Now referring to FIG. 2, which is a flow chart illustrating one embodiment according to the present disclosure. Generally, in this example, the method takes place in the ALG, however, it should be appreciated that this method may take place in a variety of hardware and/or software configurations.

When an ALG receives an SDP offer from a UA or another ALG (at step 201), it first determines the IP realm for the next segment of the media path (at step 203 and step 205). For example, in FIG. 1, if UA1 101 initiates an SDP offer towards UA2 131, then the next IP realm for ALG1 103 is R2 113, the next IP realm for ALG2 109 is R3 119, and the next IP realm for ALG4 121 is R5 127. Since ALG4 is managing the traversal of the RG 129 to R6 133, BG4 123 is not eligible for bypass unless both media path IP endpoints are in the same IP realm R6 133, so that all BGs and RGs in the media path are bypassed.

The ALG determines if a BG under its control has access both to the next IP realm associated with the connection information in the forwarded SDP offer and to an IP realm associated with a prior traversed-realm instance in the received SDP offer (at step 207). In this case the ALG can bypass one or more BGs, but not necessarily the one it controls. The ALG should select the earliest IP realm reachable from the BG and determine the number of BGs that can be bypassed by connecting the prior IP realm directly to the BG (at step 209).

The ALG then determines if an IP realm represented by a transverse-realm instance in the received SDP offer matches the IP realm of the forwarded SDP offer (at step 211). If there is a match, then the ALG can bypass one or more BGs, including the one it controls. The ALG may select the earliest matching IP realm and determine the number of BGs that can be bypassed by substituting the connection and port information from its earliest IP realm into the forwarded SDP offer (at step 213).

The ALG may then select one of the following four cases depending on applicability and local policy (at step 215). The most common local policy will be to select the case that bypasses the largest number of BGs. In cases 3 and 4, the ALG may signal that it is unwilling to be bypassed by removing all traversed-realm instances from the forwarded SDP offer.

1. Bypass the controlled BG and one or more prior BGs.
2. Bypass the controlled BG.
3. Bypass prior BGs.
4. Bypass no BGs.

SDP Offer Case 1: Bypass Controlled BG and Prior BGs

In case 1, the ALG determines that there exists a traversed-realm instance for a media line in the received SDP offer that does not correspond to the current IP realm for that media line but does match the IP realm to be used for the media line in the forwarded SDP offer. The ALG may replace the connection and port information for the media line in the SDP offer with the connection and port information from the earliest traversed-realm instance associated with the next IP realm, may delete every traversed-realm instance traversed through after the one used to populate the outgoing connection and port data, and may forward the modified SDP offer (at steps 217, 219 and 221).

An example of case 1, using FIG. 1 as reference, is that upon receiving an SDP offer from the direction of UA1, ALG3 determines that R4 125 and R1 107 are instances of the same IP realm. ALG3 substitutes the connection and port information from UA1 into the outgoing SDP offer and deletes the traversed-realm instances for R2 113 and R3 119 from the SDP before forwarding. After the end-to-end SDP offer/answer transaction is completed, the media path will bypass BG1 105, BG2 111, and BG3 117.

SDP Offer Case 2: Bypass Controlled BG

In case 2 (bypass the controlled BG), the ALG determines that the next IP realm is accessible from the current IP realm represented by the IP connection and port information for the media line in the received SDP offer. If there is a traversed-realm instance for the current IP realm associated with the media line in the received SDP offer, the ALG may forward the received SDP offer without change. Otherwise the ALG may construct a new traversed-realm instance from the connection and port information for the media line in the incoming SDP offer and may add this traversed-realm instance to the SDP offer before forwarding (at steps 217-221).

For case 2, the received SDP offer will normally include a traversed-realm instance for the current IP realm unless the previous ALG does not support the BG bypass procedures. Adding this missing information provides for more opportunities to perform BG bypass.

SDP Offer Case 3: Bypass Prior BGs

In case 3, the ALG determines that a BG under its control has access both to the next IP realm and to an IP realm associated with a prior traversed-realm instance for a media line in the received SDP offer, i.e., a traversed-realm instance that does not correspond to the connection and port information for that media line. The ALG may use the connection and port information from the earliest traversed-realm instance accessible from the BG as the remote connection and port information for the side of the BG directed towards the source of the received SDP offer. The ALG may replace the connection and port information for the media line in the SDP offer with the connection and port information from the side of its BG directed toward the recipient of the forwarded SDP offer, may delete from the SDP answer every traversed-realm instance traversed through after the earliest traversed-realm instance accessible from the BG, may add to the SDP offer a traversed-realm instance for the IP realm associated with the connection and port information for the media line in the modified SDP offer, and may forward the modified SDP offer (at steps 217, 219 and 221).

An example of case 3, using FIG. 1 as reference, is that upon receiving an SDP offer from the direction of UA1, ALG4 121 determines that BG4 123 has access to R2 113. ALG4 121 substitutes its BG connection and port information into the SDP offer, uses the connection and port information from the traversed-realm instance for R2 113 as the remote connection and port information for the UA1 101 side of BG4 123, deletes the traversed-realm instances for R3 119 and R4 125 from the SDP offer, and adds the traversed-realm instance for R5 127 before forwarding. After the end-to-end SDP offer/answer transaction is completed, the media path will bypass BG2 111 and BG3 123.

SDP Offer Case 4: Bypass No BGs

In case 4, the ALG bypasses no BGs. If there is no traversed-realm instance for the current IP realm that is associated with the media line in the received SDP offer, the ALG may construct a new traversed-realm instance from the connection and port information for the media line in the incoming SDP offer and may add this traversed-realm instance to the SDP offer to be forwarded. The ALG will replace the connection and port information for the media line in the SDP offer with the connection and port information from the side of its BG directed toward the recipient of the forwarded SDP offer (at step 217). The ALG may also add a traversed-realm instance for the IP realm associated with the connection and port information for the media line in the forwarded SDP offer, and forward the modified SDP offer (at steps 219, 221).

If the ALG is not performing hosted NAPT traversal on the side towards the source of the received SDP offer, the ALG will use the connection and port information from the incoming SDP offer as the remote connection and port information for the side of the BG directed towards the source of the received SDP offer. If the ALG is performing hosted NAPT traversal on the side towards the source of the received SDP offer, the ALG/BG may discover the IP address of the RG 129 via latching or other unspecified technique. Except for the insertion of the traversed-realm instance(s) in the outgoing SDP offer, case 4 corresponds to standard ALG behavior.

ALG Handling of SDP Answer

Figure 3:
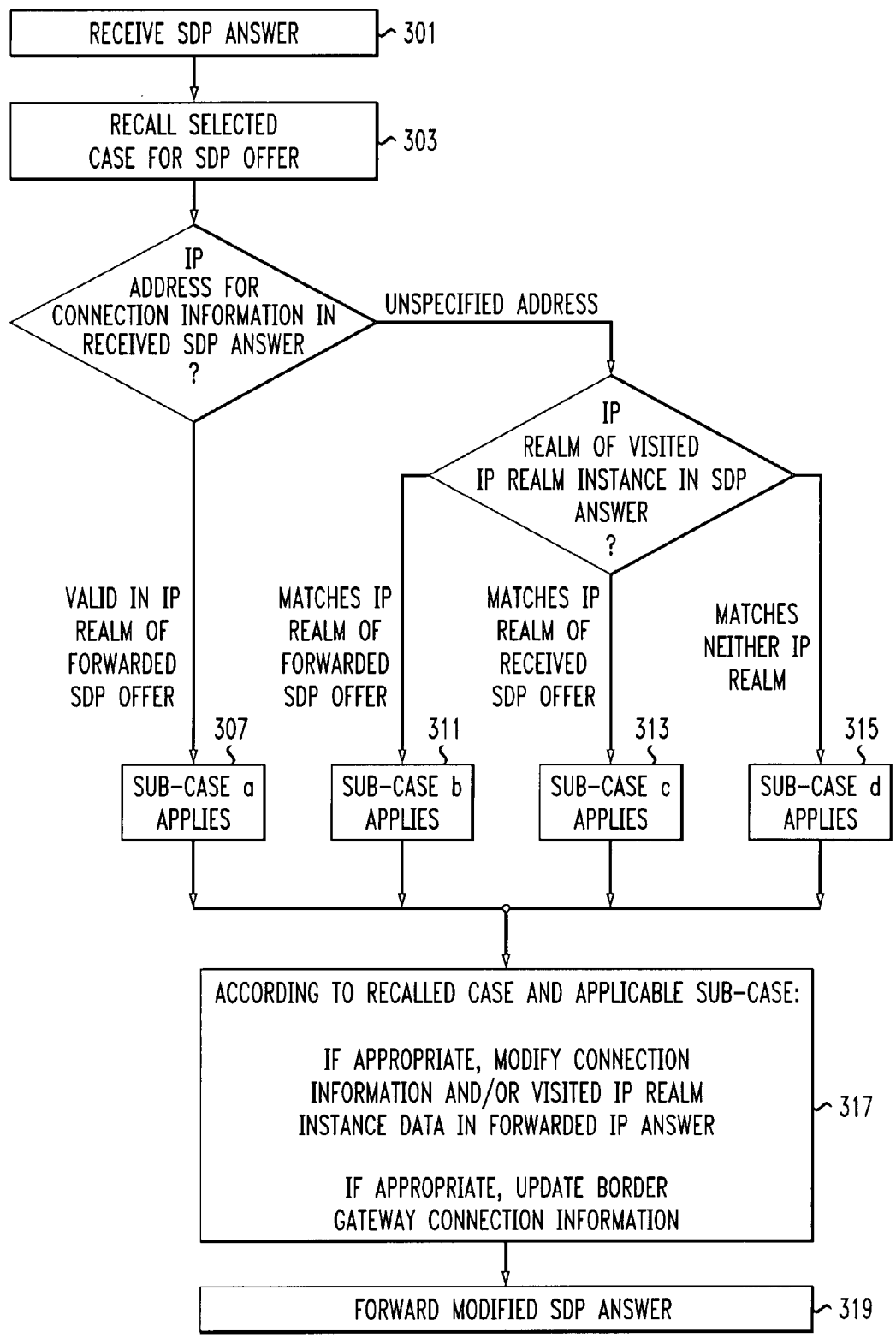
FIG. 3 is a flow diagram illustrating another embodiment of the method according to the present disclosure.

Now referring to FIG. 3 which is another embodiment of the disclosure. The method begins after forwarding an SDP offer (at step 221, FIG. 2). It should be noted that the processing of the SDP answer could be identical to the processing of the SDP offer. This however may not be ideal in all situations because the media may not flow down the same path in both directions.

The ALG may keep information about which of the four cases it selected for handling of BG bypass. The ALG uses this information in the processing of the corresponding SDP answer (at step 303), but there are additional sub-cases to be considered since downstream ALGs can also bypass BGs already traversed through, and other ALGs in the path may or may not support the BG bypass procedures. Note that there is at most one identified instance of each traversed IP realm (as represented by a traversed-realm instance) in the SDP offer that reaches its final destination. The ALG uses this fact to correctly process the SDP answer. Unidentified instances represent lost opportunities for BG bypass.

To help distinguish the additional sub-cases when processing the SDP answer, the ALG may insert into the connection information for the media line in the forwarded SDP answer either (at step 305): 1) a valid IP address for the corresponding IP realm or 2) an unspecified address. The unspecified address for IPv4 is '0.0.0.0' and for IPv6 is '0::0'.

The ALG may provide a valid IP address in the connection information for the media line in a forwarded SDP answer when the IP realm of the IP address matches the IP realm of the connection information for the media line in the previously received SDP offer (at step 305). Otherwise the ALG may include the unspecified address to indicate that the receiving ALG is to extract the connection and port information from a traversed-realm instance in the SDP answer, if one is present (at step 309).

The ALG may consider the following sub-cases when receiving an SDP answer:

a. The connection and port information for the media line in the SDP answer received by the ALG is *valid* for its IP realm. This IP realm matches the IP realm associated with the connection and port information for the corresponding media line in the SDP offer forwarded by the ALG (at step 307).

b. The connection information for the media line in the SDP answer received by the ALG is the *unspecified address*. The traversed-realm instance in the SDP answer matches the IP realm associated with the connection and port information for the corresponding media line in the SDP offer *forwarded* by the ALG (at step 311). This case should only apply if the ALG sending the SDP answer is non-compliant to the BG bypass procedures. A compliant ALG would have converted this to sub-case a.

c. The connection information for the media line in the SDP answer received by the ALG is the *unspecified address*. The traversed-realm instance in the SDP answer matches the IP realm associated with the connection and port information for the corresponding media line in the SDP offer *received* by the ALG (at step 313).

d. The connection information for the media line in the SDP answer received by the ALG is the *unspecified address*. The traversed-realm instance in the SDP answer does not match the IP realm associated with the connection and port information for the corresponding media line in the SDP offer *received* by the ALG and does not match the IP realm associated with the connection and port information for the corresponding media line in the SDP offer *forwarded* by the ALG (at step 315).

SDP Answer Sub-Case a: Valid Connection Information

In sub-case a, the ALG receives connection information for the media line in the SDP answer that corresponds to a valid IP address in its IP realm. The ALG behavior depends on which SDP offer case it selected when forwarding the SDP offer (at steps 317 and 319):

In case 1, since the ALG bypassed its BG and at least one prior BG when forwarding the SDP offer, the ALG may forward an SDP answer containing the unspecified address to signal that the ALG receiving the SDP answer is to be bypassed. The ALG may construct a new traversed-realm instance from the connection and port information for the media line in the incoming SDP answer, may add this traversed-realm instance to the SDP answer, replacing any other traversed-realm instances that may appear in the SDP answer, may replace the connection information for the media line in the SDP answer with the unspecified address, and may forward the modified SDP answer.

In case 2, since the ALG already bypassed its BG and no others in the SDP offer, it may forward the received SDP answer with no changes.

In case 3, since the ALG already bypassed at least one prior BG in the SDP offer, but did not bypass its own BG, the forwarded SDP answer will contain the unspecified address to signal that the ALG receiving the SDP answer is to be bypassed. The ALG may construct a new traversed-realm instance from the local connection and port information for the side of the BG directed towards the source of the received SDP offer, may add this traversed-realm instance to the SDP answer, may replace the connection information for the media line in the SDP answer with the unspecified address, and may forward the modified SDP answer.

In case 4, since the ALG does not bypass any BGs, the ALG may replace the connection and port information for the media line in the SDP answer with the local connection and port information for the side of its BG directed toward the source of the received SDP offer, and may forward the modified SDP answer.

In addition, when the controlled BG remains allocated, as in cases 3 and 4 with sub-case a, if the ALG is not performing hosted NAPT traversal on the side towards the SDP answerer, the ALG may use the connection and port information from the incoming SDP answer as the remote connection and port information for the side of the BG directed towards the source of the received SDP answer. If the ALG is performing hosted NAPT traversal on the side towards the source of the received SDP answer, the ALG/BG may discover the IP address of the RG via latching or other unspecified technique.

SDP Answer Sub-Case b: Match on Forwarded SDP Offer

In sub-case b, the ALG receives an unspecified address in the connection information for the media line in the SDP answer. The traversed-realm instance in the SDP answer matches the IP realm associated with the connection and port information for the corresponding media line in the SDP offer *forwarded* by the ALG. The ALG behavior depends on which SDP offer case it selected when forwarding the SDP offer (at steps 317 and 319):

In case 1, since the ALG bypassed its BG and at least one prior BG when forwarding the SDP offer, the matching IP realm has not yet been reached, so the ALG may forward the SDP answer with no changes.

In case 2, since the ALG already bypassed its BG and no others in the SDP offer, the traversed-realm instance in the received SDP answer also matches the IP realm associated with the connection and port information for the corresponding media line in the SDP offer *received* by the ALG. The ALG may replace the connection and port information for the media line in the SDP answer with the connection and port information from the traversed-realm instance in the received SDP answer, may delete the traversed-realm instance from the SDP answer, and may forward the modified SDP answer.

In case 3, since the ALG already bypassed at least one prior BG in the SDP offer, but did not bypass its own BG, the forwarded SDP answer will contain the unspecified address to signal that the ALG receiving the SDP answer is to be bypassed. The ALG may replace the traversed-realm instance for the media line in the SDP answer with a new traversed-realm instance constructed from the local connection and port information for the side of the BG directed towards the source of the received SDP offer, may retain the unspecified address in the connection information for the media line in the SDP answer, and may forward the modified SDP answer.

In case 4, since the ALG does not bypass any BGs, the ALG may replace the connection and port information for the media line in the SDP answer with the local connection and port information for the side of its BG directed toward the source of the received SDP offer, may delete the traversed-realm instance from the SDP answer, and may forward the modified SDP answer.

In addition, when the controlled BG remains allocated, as in cases 3 and 4 with sub-case b, the ALG may use the connection and port information from the traversed-realm instance in the received SDP answer as the remote connection and port information for the side of the BG directed towards the source of the received SDP answer.

SDP Answer Sub-Case c: Match on Received SDP Offer

In sub-case c, the ALG receives an unspecified address in the connection information for the media line in the SDP answer. The traversed-realm instance in the SDP answer matches the IP realm associated with the connection and port information for the corresponding media line in the SDP offer *received* by the ALG. The ALG bypasses its BG in all cases. The ALG behavior depends on which SDP offer case it selected when forwarding the SDP offer (at steps 317 and 319):

- In case 1, since the ALG bypassed its BG and at least one prior BG when forwarding the SDP offer, the matching IP realm has not yet been reached, so the ALG may forward the SDP answer with no changes, as in case 1 sub-case b.
- In case 2, since the ALG already bypassed its BG and no others in the SDP offer, the forwarded SDP answer should contain valid connection information. The ALG may perform the same procedure as for case 2, sub-case b.
- In case 3, since the ALG already bypassed at least one prior BG in the SDP offer, but did not bypass its own BG when processing the SDP offer, it will now signal the forwarded SDP answer to bypass its own BG. The ALG may forward the SDP answer with no changes.
- In case 4, since the ALG did not bypass any BGs when processing the SDP offer, it will now signal the forwarded SDP answer to bypass its own BG. The ALG may replace the connection and port information for the media line in the SDP answer with the connection and port information from the traversed-realm instance for the media line in the received SDP answer, may delete the traversed-realm instance from the SDP answer, and may forward the modified SDP answer.

SDP Answer Sub-Case d: No Match

In sub-case d, the ALG receives an unspecified address in the connection information for the media line in the SDP answer. The traversed-realm instance in the SDP answer does not match the IP realm associated with the connection and port information for the corresponding media line in the SDP offer *received* by the ALG and does not match the IP realm associated with the connection and port information for the corresponding media line in the SDP offer *forwarded* by the ALG. The ALG bypasses its BG and at least one prior BG in all cases. The ALG behavior depends on which SDP offer case it selected when forwarding the SDP offer (at steps 317 and 319):

- In case 1, the matching IP realm has not yet been reached, so the ALG may forward the SDP answer with no changes, as in case 1 sub-case b.
- In case 2, the matching IP realm has not yet been reached, so the ALG may forward the SDP answer with no changes.
- In case 3, since the ALG already bypassed at least one prior BG in the SDP offer, but did not bypass its own BG when processing the SDP offer, it will now signal the forwarded SDP answer to bypass its own BG. The ALG may forward the SDP answer with no changes, as in case 3 sub-case c.
- In case 4, since the ALG did not bypass any BGs when processing the SDP offer, it will now signal the forwarded SDP answer to bypass its own BG. The ALG may forward the SDP answer with no changes.

Special Handling of Unspecified Address from User Agents

If the UA initiating an SDP offer includes an unspecified address in the connection information, the unspecified address may be associated with the IP realm of the UA. The ALG may follow case 1 when forwarding an SDP offer with an unspecified address, where it is understood that the SDP offer contains an implicit traversed-realm instance with the unspecified address for every IP realm. The net result of this procedure is that if there is an unspecified address in the initial SDP offer, every ALG will forward an unspecified address. If the received SDP answer includes a valid IP address, it will be transformed into an unspecified address by the first ALG using sub-case a, and subsequent ALGs will include the unspecified address in the forwarded SDP answer using sub-case d. Since this procedure does not support the use of a 'black hole' address that is available for use in SIP third party call control (3 pcc) procedures to discover the connection information for the answering UA, there are some limitations to the applicability of these procedures, although none of the recommended 3 pcc procedures depend on the use of the 'black hole' address.

If the UA initiating an SDP answer includes an unspecified address in the connection information, the ALG procedures for handling of SDP answers remain unchanged, with the result that if any BGs were allocated when forwarding SDP offers, they will all be released. It is understood that every SDP answer without an explicit traversed-realm instance contains a single implicit traversed-realm instance for an unknown IP realm. Thus sub-case d always applies.

Note that if the initial SDP offer or initial SDP answer includes an unspecified address in the connection information, there can be no media flow until a subsequent SDP offer/answer transaction is performed using actual IP addresses from the user agent IP realms.

Assumptions about Non-Compliant ALGs

The procedures herein make the following assumptions when including an ALG not compliant to these procedures into an end-to-end signaling path with compliant ALGs:

Assumption 1: A non-compliant ALG may have one of the following two behaviors:

- a. When receiving an SDP message with an unspecified address in the connection information, the non-compliant ALG retains the unspecified address in the forwarded SDP message. In addition, it may forward received traversed-realm attributes without change or may delete traversed-realm attributes from the SDP messages before forwarding.

If the ALG forwards traversed-realm attributes then most opportunities for BG bypass will still be available and the procedures will be correctly applied. If the ALG deletes all traversed-realm attributes from the SDP (since they are unknown), the ALG will stay in the path and some opportunities for BG bypass will be unavailable, but the procedures will correctly establish an end-to-end media path.

- b. When receiving an SDP message with an unspecified address in the connection information, the ALG allocates a BG (if not already allocated) and converts the unspecified address into a valid IP address in the forwarded-to IP realm. The ALG deletes all traversed-realm attributes from the forwarded SDP messages.

If the ALG converts an unspecified address and forwards traversed-realm attributes, then the procedures may fail to establish a media path. The ALGs bordering a non-compliant ALG known to violate assumption "1b" may implement a work-around by manipulating the signaling to keep the non-compliant ALG in the media path, although this forfeits significant opportunities for BG bypass.

To keep a neighbor ALG in the path, a compliant ALG selects an applicable case or sub-case from the detailed procedures that ensures that real connection information is provided in all SDP messages destined to the neighbor ALG and to delete all traversed-realm attributes in SDP messages destined to or coming from the neighbor ALG.

Assumption 2: A non-compliant ALG will not terminate a session for which there is no media flow in its BG. The ALG will implicitly accept that its BG may be bypassed. The ALGs bordering a non-compliant ALG that is known to violate this assumption may implement a work-around by manipulating the signaling to keep the non-compliant ALG in the media path, although this forfeits significant opportunities for BG bypass.

The Traversed-Realm Attribute

The traversed-realm attribute is a media-level attribute only. It contains an IP realm identifier and IP address for a previously traversed through realm that can potentially be used to bypass allocated BGs.

This attribute encodes the primary information about each traversed-realm instance: the sequence in which the realm was traversed through, the realm identity, its IP address, port and transport protocol, and security credentials:

<realm-number>: is a positive integer between 1 and 256 which identifies the sequence in which this traversed-realm instance was traversed through during the forwarding of an SDP offer, compared to other traversed-realm instances for the media line in the same SDP offer. It may start at 1 and may increment by 1 compared to the highest existing realm-number for the media line when inserting a new traversed-realm instance into an SDP offer. The realm-number can be ignored in an SDP answer since there should only be one traversed-realm instance in an SDP answer. It may be the case that the realm-number will have value 1 in an SDP answer.

<realm>: identifies a set of mutually reachable IP endpoints that share a common IP addressing scheme. Each realm also defines a protection domain for all hosts using traversed-realm attribute instances for the realm, to help ensure the integrity of the remaining information in each attribute instance. A public IP address reachable from the open internet may be associated with the special realm "IN", for which no credentials are required. Operators of ALGs that wish to ensure the integrity of the traversed-realm instance information for their realm(s) may adhere to the following guidelines for creation of a realm string for their servers: 1) Realm strings may be globally unique. 2) Realm strings should present a human-readable identifier that can be rendered to a user.

<transport>: indicates the transport protocol for the traversed-realm instance. This disclosure only defines UDP. However, extensibility is provided to allow for future transport protocols to be used with these procedures, such as the Transport Control Protocol (TCP) or the Datagram Congestion Control Protocol (DCCP).

<connection-address>: is taken from RFC 4566. It is the IP address associated with the traversed-realm instance, allowing for IPv4 addresses, IPv6 addresses and FQDNs. An IP address should be used, but an FQDN may be used in place of an IP address.

<port>: is also taken from RFC 4566. It is the transport protocol port number associated with the traversed-realm instance.

<rtcp-port> and <rtcp-address>: taken together are semantically equivalent to the rtcp attribute defined in RFC 3605. They optionally encode the RTCP port and IP address information when the traversed-realm instance is for an RTP stream and the RTCP port number is not exactly one greater than the port for the RTP stream at the same IP address.

<credentials-value>: is a digital signature computed on the other contents of the attribute and other secret data. The authority for the protection domain associated with the realm may choose message digest 5 (MD5) or other algorithm to compute the credentials. For additional security, extension attributes (such as nonce and opaque used for digest) may be used to link the credentials calculated on the attribute in one SDP message to prior SDP offers or SDP answers used within a SIP dialog. Only servers within the protection domain need to verify the integrity of the attribute contents.

Since an instance of the traversed-realm attribute can only be used by a trusted node within the corresponding IP realm, the IP realm may choose to put encrypted versions of the connection-address and port information into extension parameters of the traversed-realm attribute while putting dummy values into the connection-address and port fields.

Implementation of these various network elements depend on how the system is used. These functions may be performed by some or all of the network elements in conjunction or separate from one another and may be implemented using a variety of hardware configuration and/or software techniques. This method lists but a few embodiments of the proposed system and variations may currently exist. However, this is not meant to limit the claims but instead show some embodiments as to how the method and system may be used.

The above description merely provides a disclosure of particular embodiments of the claimed invention and is not intended for the purposes of limiting the same. As such, the invention is not limited to only the above-described embodiments. Rather, it is recognized that one skilled in the art could conceive alternative embodiments that fall within the scope of the invention.

I claim:

1. A method for identifying end-to-end media paths though internet protocol realms using substitute session description protocol parameters comprising:

receiving a message including a list of previously traversed through internet protocol realms for each media line associated with a multimedia session, wherein the multimedia session includes multiple media lines comprising at least two media lines traversing different media paths through the internet protocol realms;

determining the next internet protocol realm for a media path for each media line associated with the multimedia session based at least in part on session initiation protocol signaling information; and for each media line associated with the multimedia session, if said next internet protocol realm for the corresponding media line is already associated with the same media line on said list of previously traversed through internet protocol realms, bypassing at least one border gateway associated with the previously traversed through internet protocol realms for the corresponding media line;

wherein said session description protocol parameters are in an offer message and the method further comprises:

receiving a session description protocol answer with session description protocol parameters for each media line;

recalling said session description protocol parameters in said offer message for the corresponding media line; and manipulating said session description protocol parameters in said session description protocol answer in order to establish an end-to-end media path that bypasses one or more border gateways;

wherein the session description protocol answer includes an unspecified address as connection information, the method further comprising:

determining whether traversed internet protocol realm information in said session description protocol answer matches the internet protocol realm in connection with an ingoing or outgoing border gateway.

2. The method according to claim 1, further comprising treating a host in a private network behind a network address port translator as if said host was in a private internet protocol realm in relation to identifying media paths that include another host in the private network.

3. The method according to claim 1, further comprising implementing security procedures that remove one or more instances of internet protocol realms from the list of previously traversed through realms for the corresponding media line.

4. The method according to claim 1, further comprising providing an algorithm private to each internet protocol realm for the integrity of said list of previously traversed through internet protocol realms.

5. The method according to claim 1, further comprising adding the internet protocol realm that is associated with the current message to the list of previously traversed through internet protocol realms for each media line.

6. The method according to claim 1 wherein the at least two media lines traverse different media paths to different destination endpoints.

7. The method according to claim 1 wherein the at least two media lines traverse different media paths from different source endpoints.

8. The method according to claim 1 wherein the at least two media lines include a first media line associated with a first media path and a second media line associated with a second media path different from the first media path and the determining and bypassing for the corresponding media line are performed for the first and second media lines of the multimedia session.

9. A system for identifying an end-to-end media path in internet protocol multimedia subsystems comprising:

a list of instances including information identifying internet protocol realms that a media path for each media line associated with a multimedia session has traversed through in order to establish a call; and an application level gateway configured to receive a session description protocol offer/answer having connection and port information for each media line associated with the multimedia session, determine the next internet protocol realm that said session description protocol offer/answer may traverse through for each media line, examine said list of instances for each media line, and, for each media line associated with multimedia session, if said next internet protocol realm for each media line that said media path may traverse through is already associated with the same media line on said list of instances, substitute said connection and port information to facilitate a border gateway bypass for the corresponding media line;

wherein the multimedia session includes multiple media lines comprising at least two media lines traversing different media paths through the internet protocol realms;

wherein the session description protocol answer includes an unspecified address as connection information and the application level gateway determines whether traversed internet protocol realm information in said session description protocol answer matches the internet protocol realm in connection with an ingoing or outgoing border gateway.

10. The system according to claim 9, further comprising a border gateway controlled by said application level gateway, where said border gateway is configured to restrict access to endpoints associated with said internet protocol realm for the corresponding media line.

11. The system according to claim 10, wherein access is restricted via a network access port translator.

12. The system according to claim 10, wherein said border gateway does not register on said list of instances for security purposes.

13. The system according to claim 9 wherein the at least two media lines include a first media line associated with a first media path and a second media line associated with a second media path different from the first media path and the determining and bypassing performed by the application level gateway for the corresponding media line are performed for the first and second media lines of the multimedia session.

14. A method of identifying an end-to-end media path in internet protocol multimedia subsystems comprising:

establishing a list of instances which represents internet protocol realms that a media path for each media line associated with a multimedia session has traversed through, wherein the multimedia session includes multiple media lines comprising at least two media lines traversing different media paths through the internet protocol realms;

receiving a session description protocol message having connection and port information for each media line associated with the multimedia session;

determining the next internet protocol realm that said media path may traverse through for each media line associated with the multimedia session;

examining said list of instances with respect to the each media line for said next internet protocol realm that said media path for the corresponding media line may traverse through; and for each media line associated with the multimedia session, if said next internet protocol realm that said media path may traverse through for each media line is already associated with the same media line on said list of instances, substituting said connection information and said port information in said session description protocol message in order to facilitate a bypass of at least one border gateway for the corresponding media line;

wherein the session description protocol message includes an unspecified address as connection information, the method further comprising:

determining whether traversed internet protocol realm information in said session description protocol message matches the internet protocol realm in connection with an ingoing or outgoing border gateway.

15. The method according to claim 14, wherein, if said next internet protocol realm that said media path may traverse through for the corresponding media line is already associated with the same media line on said list of instances, choosing the instance earliest in time in which to substitute said connection information and said port information in said session description protocol message for the corresponding media line.

16. The method according to claim 14 further comprising implementing a work around procedure by manipulating signaling to keep any border gateway for the corresponding media line that is not compliant with the bypass in said media path for the corresponding media line.

17. The method according to claim 14, further comprising: treating a host in a private network behind a network address port translator as if said host was in a private internet protocol realm in relation to identifying media paths that include another host in the private network.

18. The method according to claim 14 wherein the at least two media lines include a first media line associated with a first media path and a second media line associated with a second media path different from the first media path and the determining and bypassing for each media line are performed for the first and second media lines of the multimedia session.

19. A method for identifying an end-to-end media path in internet protocol multimedia subsystems comprising:
receiving a session description protocol answer with an internet protocol address;
recalling a session description protocol parameter substitution which was previously applied to a corresponding forwarded session description protocol offer; and
manipulating said session protocol parameters in said session description protocol answer in order to establish an end-to-end media path that bypasses one or more border gateways;
wherein the session description protocol answer includes an unspecified address as connection information and the method further comprises determining whether traversed internet protocol realm information in said session description protocol answer matches the internet protocol realm in connection with an ingoing or outgoing border gateway.

20. The method according to claim 19, further comprising:
treating a host in a private network behind a network address port translator as if said host was in a private internet protocol realm in relation to identifying the end-to-end media path that includes another host in the private network.

* * * * *